United States Patent
Tubby et al.

(10) Patent No.: US 9,687,762 B2
(45) Date of Patent: *Jun. 27, 2017

(54) FILTER CARTRIDGE

(71) Applicant: 3M INNOVATIVE PROPERTIES COMPANY, St. Paul, MN (US)

(72) Inventors: Brian J. Tubby, Cheshire, CT (US); Laurence W. Bassett, Killingworth, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,162

(22) Filed: Apr. 25, 2016

(65) Prior Publication Data

US 2016/0236119 A1    Aug. 18, 2016

Related U.S. Application Data

(63) Continuation of application No. 14/541,664, filed on Nov. 14, 2014, now Pat. No. 9,345,995, which is a
(Continued)

(51) Int. Cl.
| | |
|---|---|
| *B01D 27/08* | (2006.01) |
| *B01D 27/10* | (2006.01) |
| *B01D 35/30* | (2006.01) |
| *B01D 35/153* | (2006.01) |
| *C02F 9/00* | (2006.01) |
| *F16K 5/04* | (2006.01) |

(52) U.S. Cl.
CPC ........... *B01D 27/108* (2013.01); *B01D 27/08* (2013.01); *B01D 35/153* (2013.01); *C02F 9/005* (2013.01); *F16K 5/0414* (2013.01); *B01D 2201/4023* (2013.01); *B01D 2201/4046* (2013.01); *B01D 2201/4053* (2013.01); *B01D 2201/4061* (2013.01); *Y10T 29/49826* (2015.01); *Y10T 137/86863* (2015.04)

(58) Field of Classification Search
CPC .... B01D 27/108; B01D 27/08; B01D 35/153; B01D 2201/4053; B01D 2201/4061; B01D 2201/4046; B01D 2201/4023; C02F 9/005; F16K 5/0414; Y10T 137/86863; Y10T 29/49826
See application file for complete search history.

(56) References Cited

U.S. PATENT DOCUMENTS

| | | |
|---|---|---|
| 1,688,326 A | 10/1928 | Boulade |
| 2,857,128 A | 10/1958 | Stern |
| (Continued) | | |

FOREIGN PATENT DOCUMENTS

| | | |
|---|---|---|
| EP | 0269054 | 6/1988 |
| JP | 51-029619 | 7/1976 |
| (Continued) | | |

OTHER PUBLICATIONS

PCT International Search Report for PCT/US2006/018929, dated Oct. 4, 2006.

*Primary Examiner* — David C Mellon
(74) *Attorney, Agent, or Firm* — Scott A. Baum

(57) ABSTRACT

A filter cartridge for operatively engaging a manifold having an ejection cam and an insertion cam. The filter cartridge includes a filter element and inlet/outlet portion in fluid communication with the filter element.

21 Claims, 15 Drawing Sheets

Related U.S. Application Data continuation of application No. 13/459,441, filed on Apr. 30, 2012, now Pat. No. 8,911,623, which is a continuation of application No. 13/325,175, filed on Dec. 14, 2011, now abandoned, which is a continuation of application No. 11/435,676, filed on May 16, 2006, now Pat. No. 8,097,158.

(60) Provisional application No. 60/681,649, filed on May 16, 2005.

(56) References Cited

U.S. PATENT DOCUMENTS

| | | |
|---|---|---|
| 3,399,776 A | 9/1968 | Knuth |
| 3,643,692 A | 2/1972 | Traylor |
| 3,684,100 A | 8/1972 | Close |
| 3,727,764 A | 4/1973 | Ogden |
| 3,742,970 A | 7/1973 | Gross |
| 3,823,742 A | 7/1974 | Von Corpon |
| 3,926,187 A | 12/1975 | Iglesias |
| 4,108,207 A | 8/1978 | Doody |
| 4,420,396 A | 12/1983 | Yamamoto |
| 4,469,131 A | 9/1984 | Traylor |
| 4,529,515 A | 7/1985 | Selz |
| 4,711,717 A | 12/1987 | Wolf |
| 4,806,240 A | 2/1989 | Giordano |
| 4,818,396 A | 4/1989 | Wolf |
| 4,836,925 A | 6/1989 | Wolf |
| 4,857,189 A | 8/1989 | Thomsen |
| 4,905,965 A | 3/1990 | Dolev |
| 4,979,530 A | 12/1990 | Breda |
| 5,152,321 A | 10/1992 | Drager |
| 5,230,812 A | 7/1993 | Williams |
| 5,336,406 A | 8/1994 | Stanford |
| 5,389,260 A | 2/1995 | Hemp |
| 5,397,462 A | 3/1995 | Higashijima |
| 5,445,734 A | 8/1995 | Chen |
| 5,461,948 A | 10/1995 | Perrero, Jr. |
| 5,511,464 A | 4/1996 | Cezanne |
| 5,762,788 A | 6/1998 | Gullett |
| 5,876,599 A | 3/1999 | Sylvester |
| 5,882,511 A | 3/1999 | Blomquist |
| 5,919,362 A | 7/1999 | Barnes |
| 5,931,196 A | 8/1999 | Bernardi |
| 6,422,267 B1 | 7/2002 | Makishima |
| 6,457,698 B2 | 10/2002 | Wichmann |
| 6,458,269 B1 | 10/2002 | Bassett |
| 6,533,933 B1 | 3/2003 | Stankowski |
| 6,579,455 B1 | 6/2003 | Muzik |
| 6,632,355 B2 | 10/2003 | Fritze |
| 6,645,376 B2 | 11/2003 | Marioni |
| 6,649,056 B2 | 11/2003 | Fritze |
| 6,857,670 B2 | 2/2005 | Fritze |
| 6,899,132 B2 | 5/2005 | Mikiya |
| 6,949,189 B2 | 9/2005 | Bassett |
| 7,000,894 B2 | 2/2006 | Olson |
| 7,147,773 B2 | 12/2006 | Mitchell |
| 7,387,210 B2 | 6/2008 | Burrows |
| 7,407,148 B2 | 8/2008 | Bassett |
| 7,501,057 B1 | 3/2009 | Go |
| 7,638,042 B2 | 12/2009 | Astle |
| 7,651,070 B2 | 1/2010 | Ruprecht |
| 8,282,820 B2 | 10/2012 | Cur |
| 2003/0019819 A1 | 1/2003 | Fritze |
| 2003/0164324 A1 | 9/2003 | Chauquet |
| 2003/0168394 A1 | 9/2003 | Gill |
| 2004/0232064 A1 | 11/2004 | Wilkinson |
| 2005/0023206 A1 | 2/2005 | Fritze |
| 2005/0067342 A1 | 3/2005 | Bassett |
| 2006/0032806 A1 | 2/2006 | Parker |
| 2006/0060512 A1 | 3/2006 | Astle |
| 2006/0113240 A1 | 6/2006 | Burrows |
| 2008/0000820 A1 | 1/2008 | Mitchell |
| 2008/0156711 A1 | 7/2008 | Vitan |

FOREIGN PATENT DOCUMENTS

| | | |
|---|---|---|
| JP | 58-67510 | 5/1983 |
| KR | 10-0772889 | 11/2007 |
| KR | 10-0870572 | 11/2008 |
| WO | WO 2005/077490 | 8/2005 |
| WO | WO 2006/124906 | 11/2006 |
| WO | WO 2010/027989 | 3/2010 |

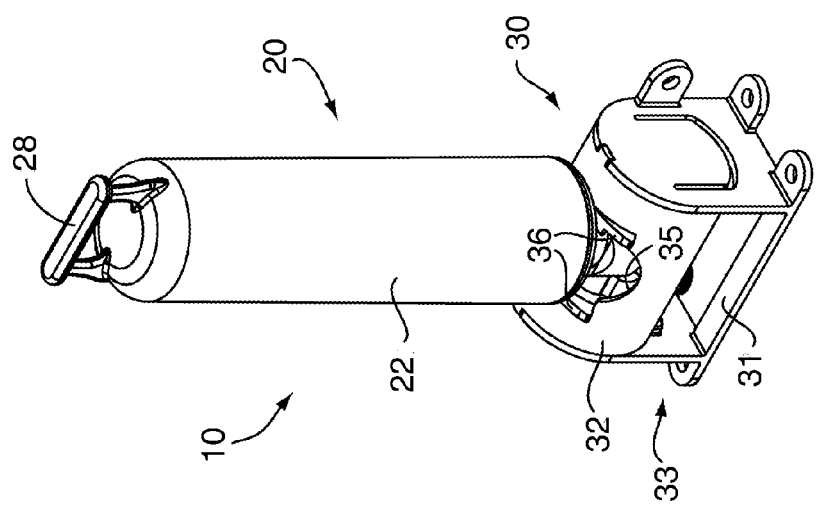
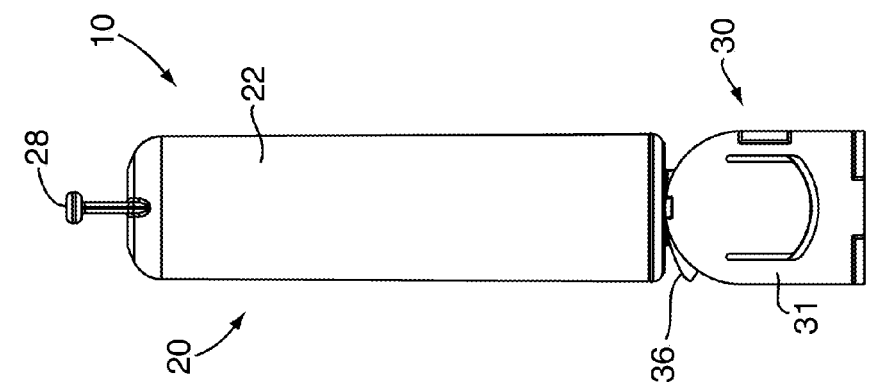
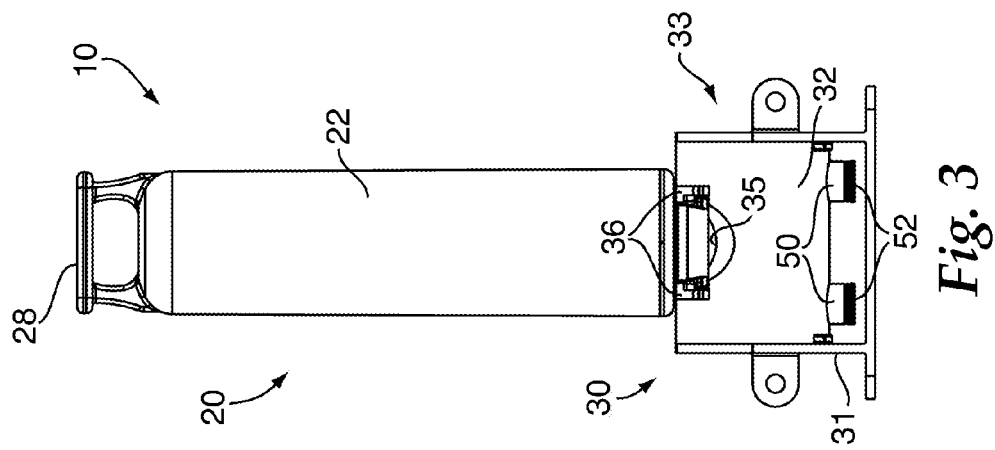

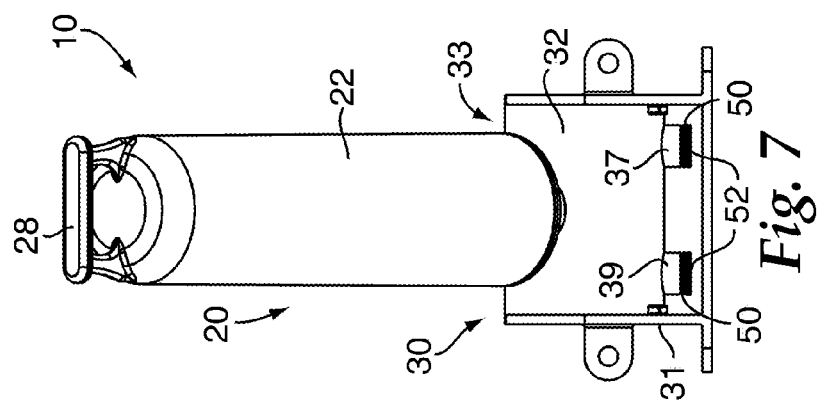
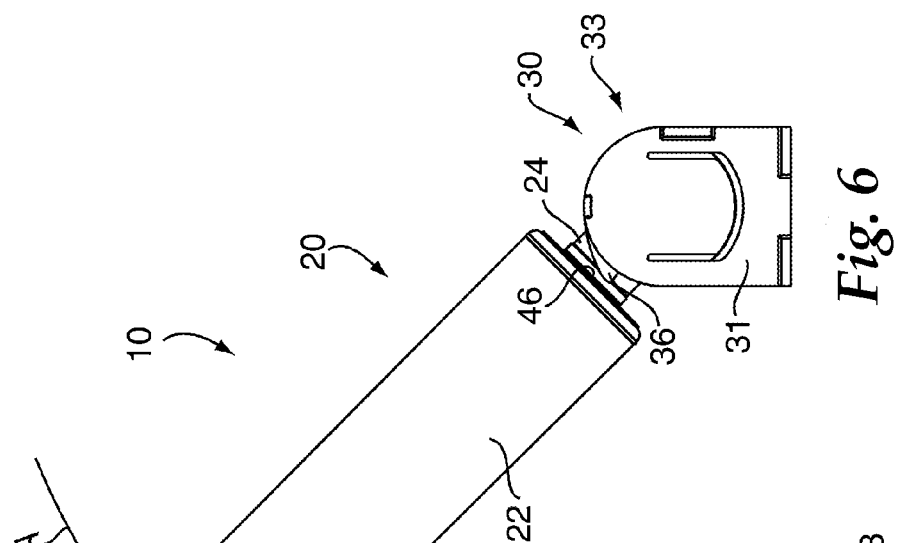
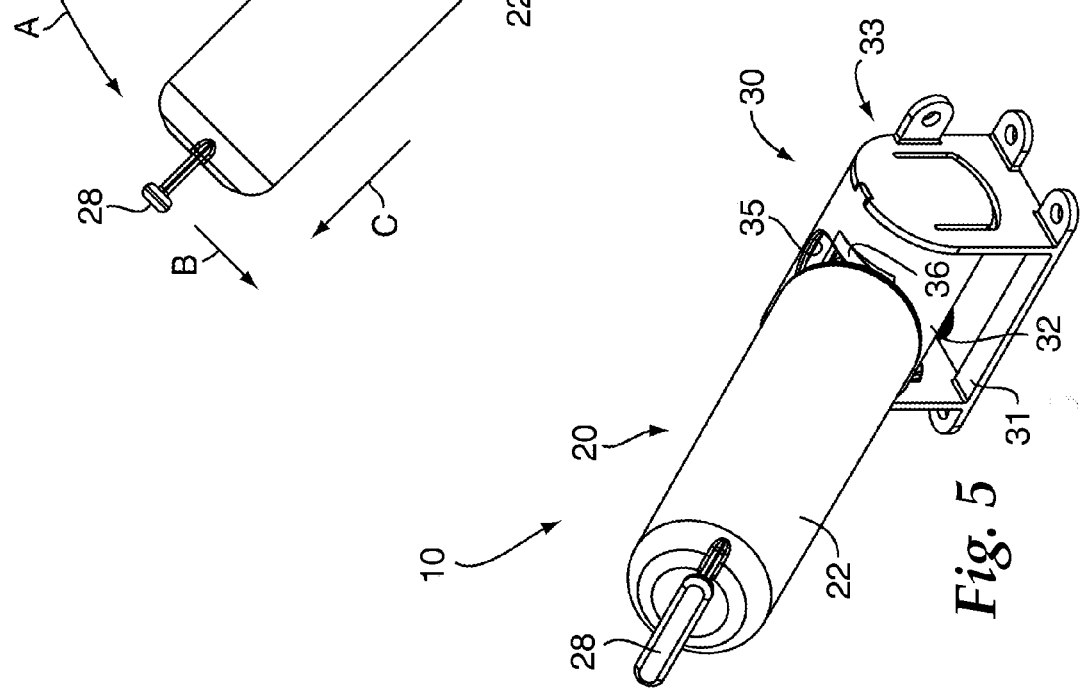

FILTER CARTRIDGE

RELATED APPLICATIONS

This application is a continuation of U.S. patent application Ser. No. 14/541,664, filed Nov. 14, 2014, now allowed which is a continuation of U.S. patent application Ser. No. 13/459441, filed Apr. 30, 2012, entitled "FILTER CARTRIDGE", now issued as U.S. Pat. No. 8,911,623, issued on Dec. 16, 2014, which is a continuation of U.S. patent application Ser. No. 13/325,175, filed Dec. 14, 2011, entitled "SPOOL VALVE MANIFOLD INTERCONNECT FOR A FILTER SYSTEM," which is a continuation of commonly owned U.S. patent application Ser. No. 11/435,676, filed May 16, 2006, by Tubby, entitled "SPOOL VALVE MANIFOLD INTERCONNECT FOR A FILTER SYSTEM," now issued as U.S. Pat. No. 8,097,158, which claims benefit of U.S. Provisional Patent Application Ser. No. 60/681,649, filed May 16, 2005, entitled SPOOL VALVE INTERCONNECT FOR A FILTER SYSTEM, the disclosures of each are herein incorporated by reference to the extent not inconsistent with the present disclosure.

BACKGROUND OF THE DISCLOSURE

The present disclosure relates in general to a system operatively positioned in a fluid supply system comprising a manifold assembly and a replaceable fluid filter cartridge containing filter media, the manifold assembly having the capability for facilitating the removal of a first replaceable fluid filter cartridge and then having the capability for facilitating the installation of another replaceable fluid filter cartridge therein in a fluid supply system and, in particular, to a spool valve manifold assembly that facilitates the quick and easy removal and installation of the replaceable fluid filter cartridges from and into the manifold assembly.

Manifold assemblies having the capability for facilitating the removal of a first fluid filter cartridge and then having the capability for facilitating the installation of another replaceable fluid filter cartridge in a fluid supply system for industrial, commercial and consumer use are widely known throughout the industry. For example, most modern refrigerators, which provide drinking water and produce ice, and beverage dispensing machines, such as coffee makers and soda dispensers, use an internal fluid filtration system having replaceable fluid filter cartridges for filtering certain contaminates from the fluid, such as, water.

Given the use of relatively small amount of filter media contained within the compact replaceable fluid filter cartridges, frequent replacement of the replaceable fluid filter cartridges within the fluid filtration system is required. Therefore, these filtration systems are typically equipped with replacement filter cartridges that can be disengaged from a filtration system and replaced.

Unfortunately, such fluid filtration system may not always be placed in the most accessible location or at the most desirable orientation for a user to remove the old fluid filter cartridge and install a new one. Further compounding the problem of removing the old fluid filter cartridge from the fluid supply system is that the flow of fluid from the system must be shut off prior to removal of the replacement fluid filter cartridge.

An example of a prior art filter and valve apparatus providing for replacement of an encapsulated filter is disclosed in U.S. Pat. No. 6,579,455 to Muzik et al. Muzik discloses a gate-type valve, wherein a receptacle disk for receiving a filter is rotatably coupled to an upper plate having fluid supply inlet and outlet ports. The receptacle disk includes through passages for receiving inlet and outlet ports of the filter. When there is no filter inserted into these passages, the passages are not aligned with the fluid supply inlet and outlet ports of the upper plate. After insertion of the filter into the receptacle disk, the filter and the receptacle disk can be rotated around the longitudinal axis of the filter to align the inlet and outlet ports of the filter with the inlet and outlet ports of the fluid supply.

U.S. Pat. No. 4,979,530 to Breda and U.S. Pat. No. 6,457,698 to Wichmann disclose spool valves.

One disadvantage of the prior art is that the valves can become hard to operate due to the sealing O-rings taking a compression set over time. Because of this compression set, a high breaking force to initially move the valve is required.

Thus, there is a need for an inexpensive, reliable device that can provide for the quick and easy replacement of filter cartridges in a fluid filtration system. There is a further need for a device that can integrate the replacement of the filter cartridge with the opening and closing of the valve and that can be operated with a minimum of force.

SUMMARY OF THE DISCLOSURE

One representative embodiment of the present disclosure includes a spool valve manifold for use with a fluid filter cartridge having an inlet/outlet portion that includes a cartridge inlet port and a cartridge outlet port. The spool valve manifold includes a valve housing having a housing inlet port and a housing outlet port and a valve body located within the valve housing and configured to rotate around a first axis relative to the valve housing. The valve body is configured to receive the inlet/outlet portion of the filter cartridge via insertion of the inlet/outlet portion into the valve body in a direction perpendicular to the first axis. The housing inlet port and the cartridge inlet port are in fluid communication via a first fluid flow path and the housing outlet port and the cartridge outlet port are in fluid communication via a second fluid flow path when the valve body is at a first rotational position relative to the valve housing. The housing inlet port and the cartridge inlet port are not in fluid communication and the housing outlet port and the cartridge outlet port are not in fluid communication when the valve body is at a second rotational position relative to the valve housing.

Another representative embodiment of the present disclosure includes a filter cartridge and spool valve manifold assembly having a filter cartridge and a spool valve manifold. The filter cartridge includes a filter media element and inlet/outlet portion in fluid communication with the filter element. The inlet/outlet portion has a cartridge inlet port and a cartridge outlet port. The spool valve manifold includes a housing and a body. The housing has a housing inlet port and a housing outlet port adapted for fluid communication with a fluid supply system. The body is located within the housing and configured to rotate around a first axis relative to the housing. The inlet/outlet portion of the filter cartridge is fluidly coupled to the body via insertion of the inlet/outlet portion into the body in a direction perpendicular to the first axis.

In one aspect of the present disclosure, the housing inlet port and the housing outlet port are in fluid communication via a third fluid flow path when the valve body is at the second rotational position relative to the valve housing.

In another aspect of the present disclosure, the housing inlet port and the housing outlet port are not in fluid communication when the valve body is at the second rotational position relative to the valve housing.

In even another aspect, the valve housing further may include an insertion cam component configured to cooperate with a complementary insertion cam component on the filter cartridge.

In a further aspect, the valve housing further may include an ejection cam component configured to cooperate with a complementary ejection cam component on the filter cartridge.

In even another aspect, the spool valve manifold further may include a first seal located between the valve body and the valve housing and configured to prevent fluid leakage from the first fluid flow path and a second seal located between the valve body and the valve housing and configured to prevent fluid leakage from the second fluid flow path.

In another aspect, the spool valve manifold may also include a third seal located between the valve body and the valve housing and configured to prevent fluid leakage from the third fluid flow path.

In one aspect, the angle between the first and second rotational positions may be less than 90 degrees.

In a further aspect, the filter cartridge includes a handle at an end of the filter cartridge that is opposite the inlet/outlet portion.

In one aspect, a bracket is coupled to the valve housing and configured to mount the spool valve manifold to an appliance.

In even a further aspect, a bracket is rotatably mounted adjacent the spool valve and configured to slidably hold the filter cartridge as the body rotates from the first to the second rotational position.

Other objects and advantages of the disclosure will be apparent from the following description, the accompanying drawings and the appended claims.

BRIEF DESCRIPTION OF THE DRAWINGS

FIG. 1 is a perspective view of a fluid filter cartridge and spool valve manifold assembly according to a representative embodiment of the present disclosure, with the assembly shown in a first rotational position;

FIG. 2 is a side view of the fluid filter cartridge and spool valve manifold assembly according to the representative embodiment of FIG. 1;

FIG. 3 is a front view of the fluid filter cartridge and spool valve manifold assembly according to the representative embodiment of FIG. 1;

FIG. 5 is a perspective view of the fluid filter cartridge and spool valve manifold assembly, according to a representative embodiment of FIG. 1, with the assembly shown in a second rotational position;

FIG. 6 is a side view of the fluid filter cartridge and spool valve manifold assembly according to the aspect of FIG. 5;

FIG. 7 is a front view of the fluid filter cartridge and spool valve manifold assembly according to the aspect of FIG. 5;

Figure 4:
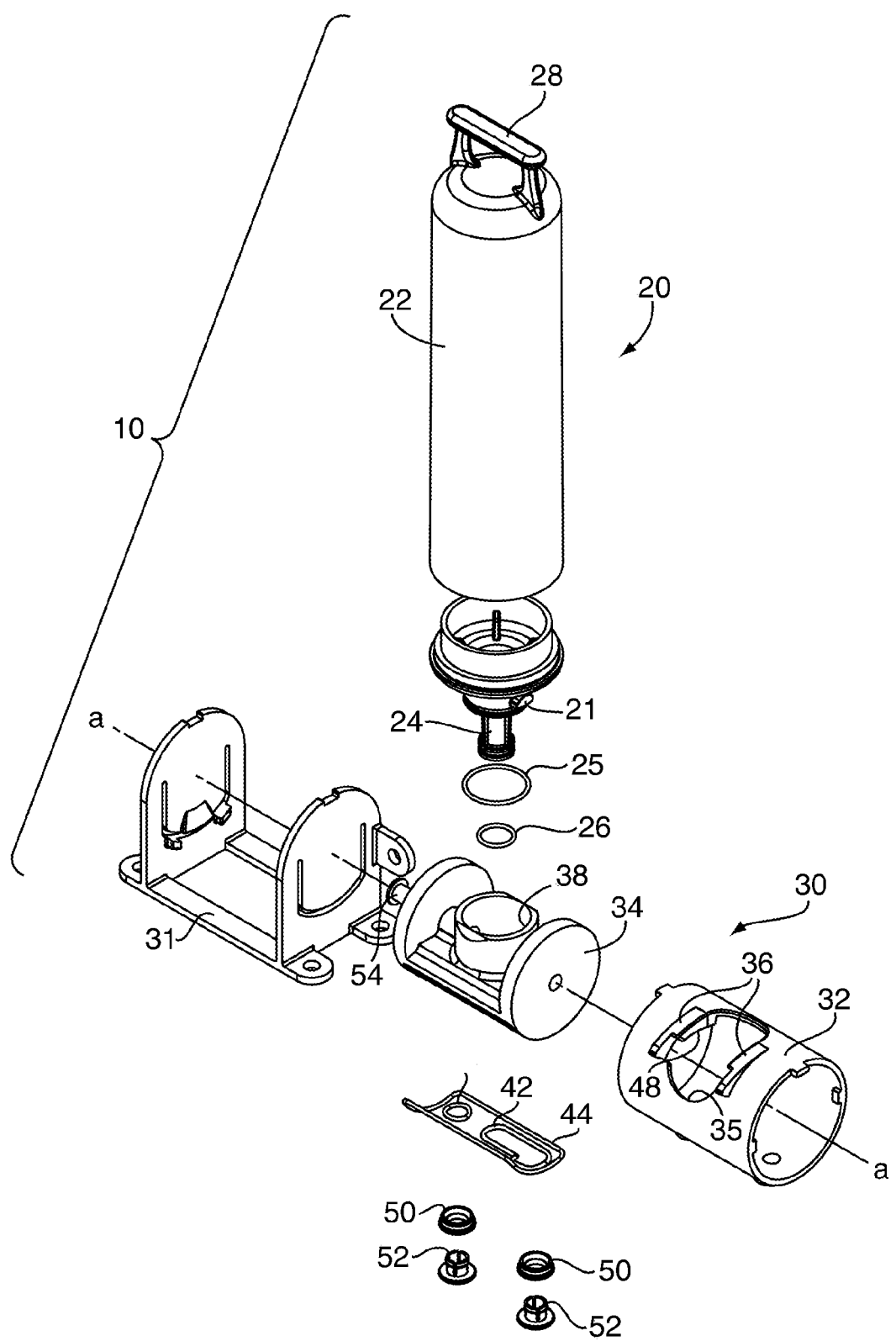
FIG. 4 is an exploded perspective view of the fluid filter cartridge and spool valve manifold assembly according to the representative embodiment of FIG. 1.

These and other features of the subject disclosure will become more readily apparent to those having ordinary skill in the art from the following detailed description of the representative embodiments.

DETAILED DESCRIPTION OF REPRESENTATIVE EMBODIMENTS

As discussed hereinabove, the present disclosure overcomes several disadvantages associated with the prior art fluid filter systems. The advantages and other features of the fluid filter systems, comprising a representative manifold assembly and a representative replaceable fluid filter cartridge containing filter media, disclosed herein, will become more readily apparent to those having ordinary skill in the art from the following detailed description of the representative embodiments taken in conjunction with the drawings which set forth some representative embodiments of the present disclosure.

Referring now to the drawings wherein like reference numerals identify similar structural elements and/or features of the subject disclosure, there is illustrated in FIGS. 1-3 a representative fluid filter cartridge and a representative spool valve manifold assembly constructed in accordance with an exemplary, representative embodiment of the subject disclosure and designated generally by reference numeral 10. Filter cartridge and spool valve manifold assembly 10 includes a fluid filter cartridge 20 and a spool valve manifold 30. As will be explained below, filter cartridge and spool valve manifold assembly 10 is shown in FIGS. 1-3 in a first rotational position.

As best illustrated in FIG. 4, filter cartridge 20 generally includes a representative sump 22 and a representative filter cover or inlet/outlet portion 24. As is known in the art, a filter element 23 (see FIG. 9) is located within sump 22. The representative filter cartridge 20 may also include handle 28.

Spool valve manifold 30 includes a representative valve housing 32 and a representative valve body 34. Valve body 34 rotates around axis a-a relative to valve housing 32. Spool valve manifold 30 is shown mounted within bracket 31 and this spool valve manifold/bracket subassembly will be referred to as mounted spool valve manifold 33. Valve housing 32 of spool valve manifold 30 may be snap mounted to bracket 31, although other assembly methods as known to persons of ordinary skill in the art could be used. Bracket 31 may be used to mount spool valve manifold 30 to the wall of an appliance (not shown) adjacent inlet and outlet ports of the fluid supply system (not shown). Valve housing 32 and bracket 31 typically remain stationary.

In the illustrated representative assembled configuration, representative seals 25 and 26 are located between inlet/outlet portion 24 and valve body 34 and representative seals 40, 42 and 44 are located between valve housing 32 and valve body 34. Tube connectors 50, 52, as known in the art, are used to connected spool valve manifold 30 to the fluid supply system. Other means of connecting tubing to the valve housing can be used such as the welded tubing attachment method that is disclosed in U.S. Pat. No. 6,857,670 B2, the disclosure of which is herein incorporated by reference to the extent not inconsistent with the present disclosure.

FIGS. 5-7 show filter cartridge and spool valve manifold assembly 10 in a second rotational position. As best illustrated by comparing FIG. 2 to FIG. 6, filter cartridge 20 rotates relative to bracket 31 in the direction of arrow A (around axis a-a of FIG. 4) when moving from the first rotational position as illustrated in FIG. 2 to the second rotational position as illustrated in FIG. 6. In the representative embodiment illustrated in FIGS. 1-7, movement of filter cartridge 20 in the direction of arrow A may be accomplished by pulling on handle 28 in the direction of arrow B. Also, in the representative embodiment illustrated in FIGS. 1-7, movement of filter cartridge 20 in the direction of arrow A causes filter cartridge 20 to move in the direction of arrow C. Movement in the direction of arrow C is perpendicular to the direction of axis a-a. This is due to a camming action between filter cartridge 20 and cams 36 (best illustrated in FIG. 4).

Figure 8:
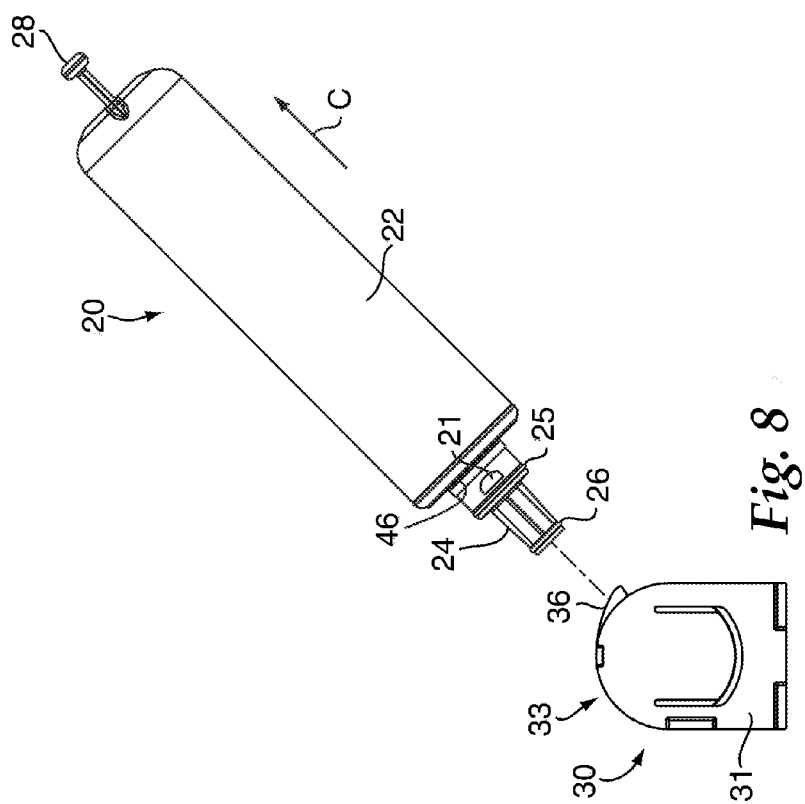
FIG. 8 is a side view of the fluid filter cartridge and spool valve manifold assembly according to the aspect of FIG. 5, with the fluid filter cartridge shown removed from the assembly.

As will be described below, filter cartridge 20 is operatively coupled to valve body 34. Thus, when filter cartridge 20 rotates, valve body 34 also rotates. As filter cartridge 20 is rotated from the first rotational position to the second rotational position, cams 36 cause filter cartridge 20 to be ejected from valve body 34 and correspondingly from mounted spool valve manifold 33, thereby disconnecting filter cartridge 20 from spool valve manifold 30. FIG. 8 shows filter cartridge 20 removed from mounted spool valve manifold 33.

In the representative embodiment illustrated in FIGS. 1-8, the angle through which filter cartridge 20 rotates relative to bracket 31 is approximately 45 degrees. This angle could be more or less than 45 degrees, with an angle of less than 90 degrees expected to be suitable for most applications, although an angle of more than 90 degrees would lie within the scope of the disclosure.

Figure 9:
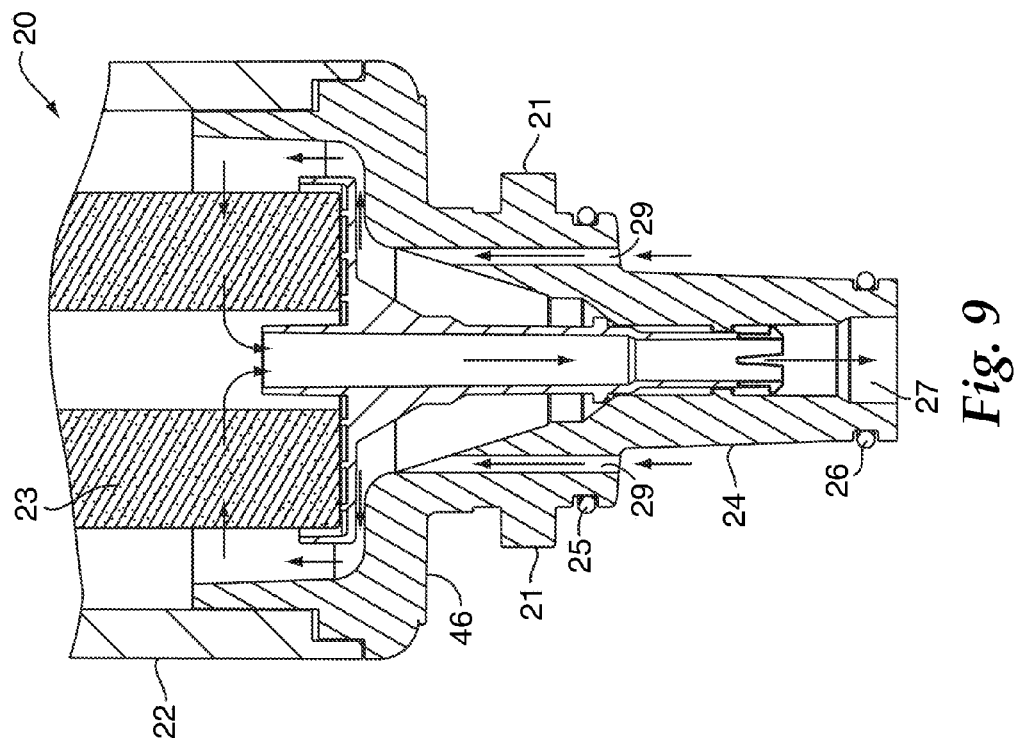
FIG. 9 is a cross-sectional side view of a portion of a fluid filter cartridge according to one representative embodiment of the present disclosure.

As best illustrated in FIG. 9, one representative filter cartridge 20 has an inlet/outlet portion 24 at the top end thereof for the ingress and egress of fluid into interior chamber of filter cartridge 20 and into filter element 23. Filter element 23 may include any suitable filter media as is known in the art. Inlet/outlet portion 24 includes a representative cartridge outlet port 27 having a central through bore through which filtered fluid may exit filter cartridge 20. Cartridge outlet port 27 may be generally aligned with a central axis of filter cartridge 20. Circumferentially surrounding cartridge outlet port 27 are representative cartridge inlet ports 29, formed as arcuate through bores through which unfiltered fluid may enter filter cartridge 20. Inlet/outlet portion 24 is configured as a quick connect/disconnect fitting for mating with spool valve manifold 30. A person of ordinary skill in the art would appreciate that other inlet and outlet configurations lie within the scope of the disclosure.

Cartridge inlet port 29 of inlet/outlet portion 24, as best illustrated in FIG. 9, channels the incoming unfiltered fluid to the outer circumferential surface of filter element 23. The unfiltered fluid then travels radially inward through the filter media and is filtered in the process. The filtered fluid exits filter element 23 through cartridge outlet port 27.

Inlet/outlet portion 24 and other portions of filter cartridge 20, such as sump 22, may be formed of any suitable material known to persons of ordinary skill in the art, including, but not limited to, for example, molded 20% talc-filled prolypropylene homopolymer or isoplast. Typically, a suitable material would be a standard National Standard Foundation (NSF) approved material.

Figure 10:
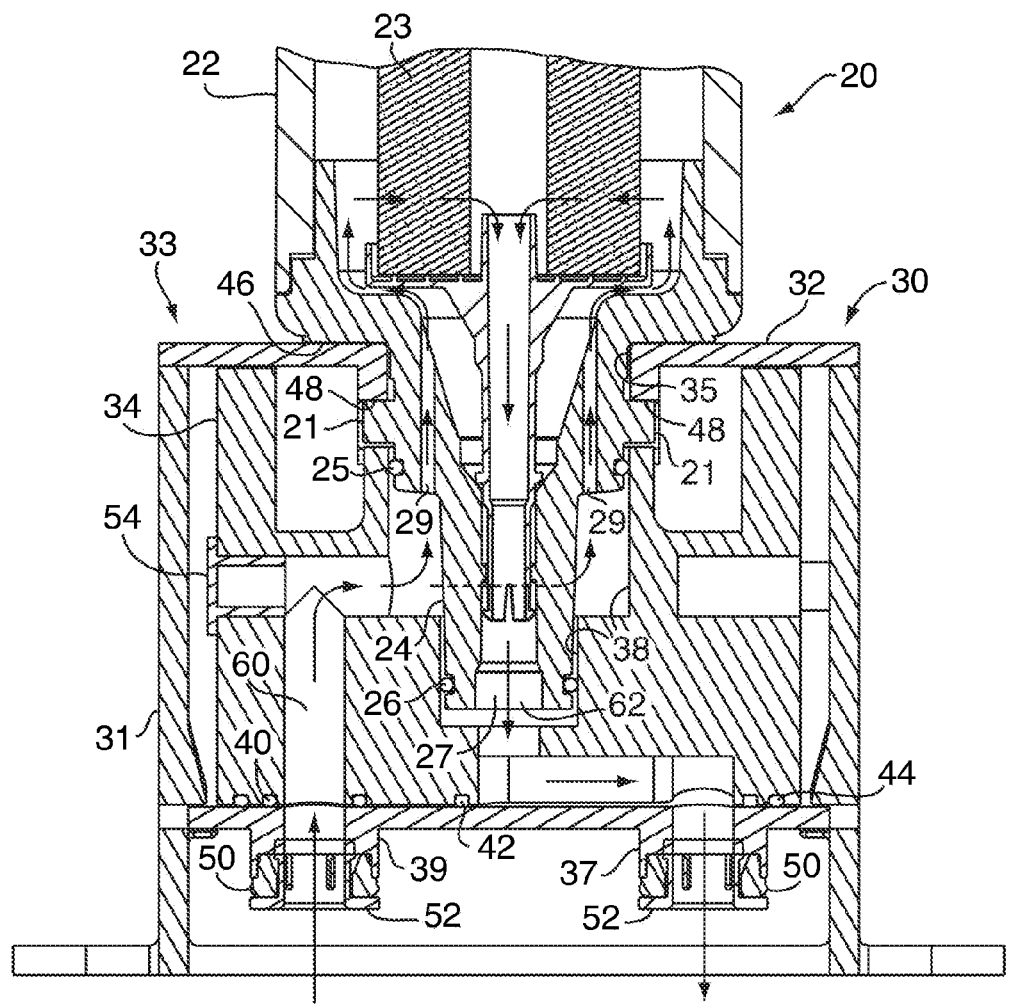
FIG. 10 is a partial cross-sectional side view of a portion of a fluid filter cartridge inserted into a spool valve manifold assembly according to a representative embodiment of the present disclosure, with the filter cartridge and valve body in a first rotational position.

Representative O-rings or other seals 25, 26 (as best illustrated in FIGS. 4 and 9) may be located around the outer circumference of cartridge inlet ports 29 and cartridge outlet ports 27. As best illustrated in FIG. 10, when filter cartridge 20 is installed in spool valve manifold 30, seals 25, 26 are located between inlet/outlet portion 24 and the complementary filter cartridge mounting surfaces 38 of spool valve manifold body 34. Seals 25, 26 isolate and prevent leakage between an unfiltered fluid flow path 60 and a filtered fluid flow path 62. Seals 25, 26 may be formed from nitrile rubber (NBR) or ethylene-propylene-diene rubber (EPDM) elastomers or other suitable materials known to persons of ordinary skill in the art.

FIG. 10 shows filter cartridge 20 inserted into valve body 34 of spool valve manifold 30 in the first rotational position. An opening 35 in the wall of valve housing 32 accommodates the insertion of filter cartridge 20 into valve body 34. Opening 35 is sized to accommodate the movement of filter cartridge 20 from the first rotational position to the second rotational position. In the first rotational position, cartridge inlet port 29 is in fluid communication with a housing inlet port 39 and cartridge outlet port 27 is in fluid communication with a housing outlet port 37. Unfiltered fluid from the fluid supply system (not shown) flows into housing inlet port 39 and into filter cartridge 20 via unfiltered fluid flow path 60 and cartridge inlet port 29. Filtered fluid flows from filter cartridge 20 and out through housing outlet port 37 to the fluid supply system (not shown) via cartridge outlet port 27 and filtered fluid flow path 62.

As illustrated in FIGS. 4 and 10, a plug 54 may be provided to simplify the manufacture of valve body 34 and close off unfiltered fluid flow path 60 from the atmosphere, as would be understood by a person skilled in the molding manufacturing art.

Figure 11:
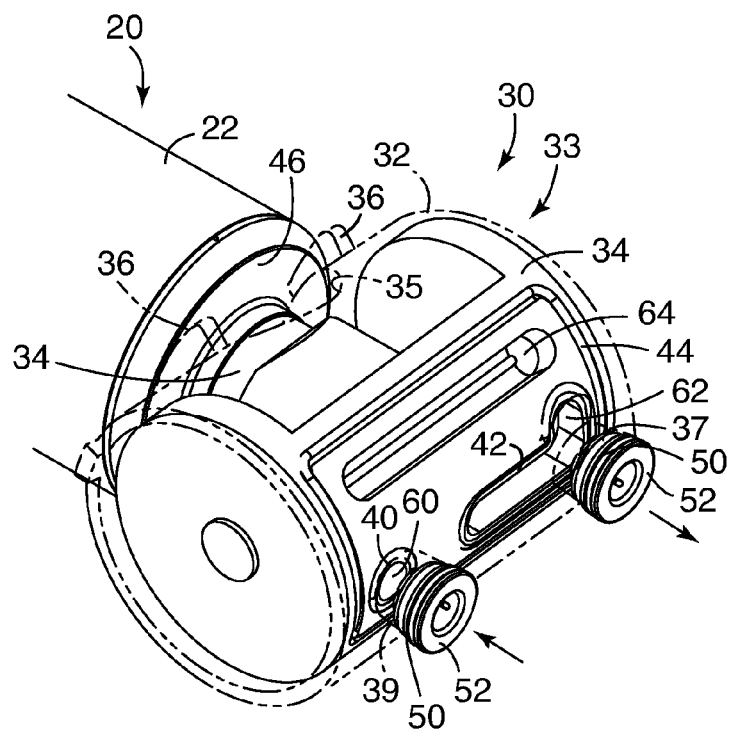
FIG. 11 is a perspective view of a portion of the fluid filter cartridge and spool valve manifold assembly, with the valve housing shown partially transparent, and with the fluid filter cartridge and the valve body shown in the first rotational position.

As illustrated in FIGS. 4 and 10 and as best illustrated in FIG. 11, seals 40 and 42 isolate unfiltered fluid flow path 60 from filtered fluid flow path 62. Specifically, seal 40 is located between valve housing 32 and valve body 34 and surrounds unfiltered fluid flow path 60 at this juncture. Seal 42 is located between valve housing 32 and valve body 34 and surrounds filtered fluid flow path 62 at this juncture. Seals 40 and 42 may be positioned within grooves as is known in the art.

Figure 12:
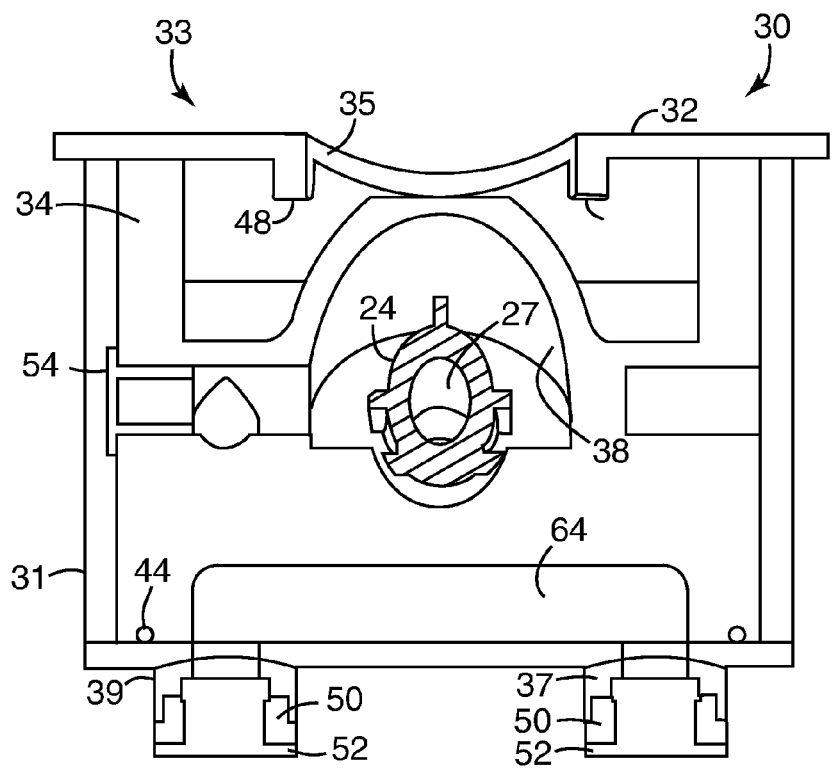
FIG. 12 is a partial cross-sectional side view of a portion of a fluid filter cartridge inserted into a spool valve manifold assembly according to a representative embodiment of the present disclosure, with the fluid filter cartridge and the valve body in a second rotational position.

FIG. 12 shows inlet/outlet portion 24 of filter cartridge 20 inserted into spool valve manifold 30 in the second rotational position. In this second rotational position, housing inlet port 39 is in fluid communication with a housing outlet port 37 without being in fluid communication with filter cartridge 20. Unfiltered fluid from the fluid supply system (not shown) flows into housing inlet port 39 and out through housing outlet port 37 via bypass fluid flow path 64 (also shown in FIG. 11). Thus, unfiltered fluid from the fluid supply system (not shown) never reaches filter cartridge 20. Rather, in the second rotational position, filter cartridge 20 is isolated from the fluid supply system. Bypass fluid flow path 64 allows unfiltered fluid to flow directly to housing outlet port 37. This allows fluid to be supplied to a user downstream of filter cartridge and spool valve manifold assembly 10 even if filter cartridge 20 is not filtering the fluid supply. Thus, the flow of fluid downstream of filter cartridge and spool valve manifold assembly 10 need never be disrupted.

Figure 13:
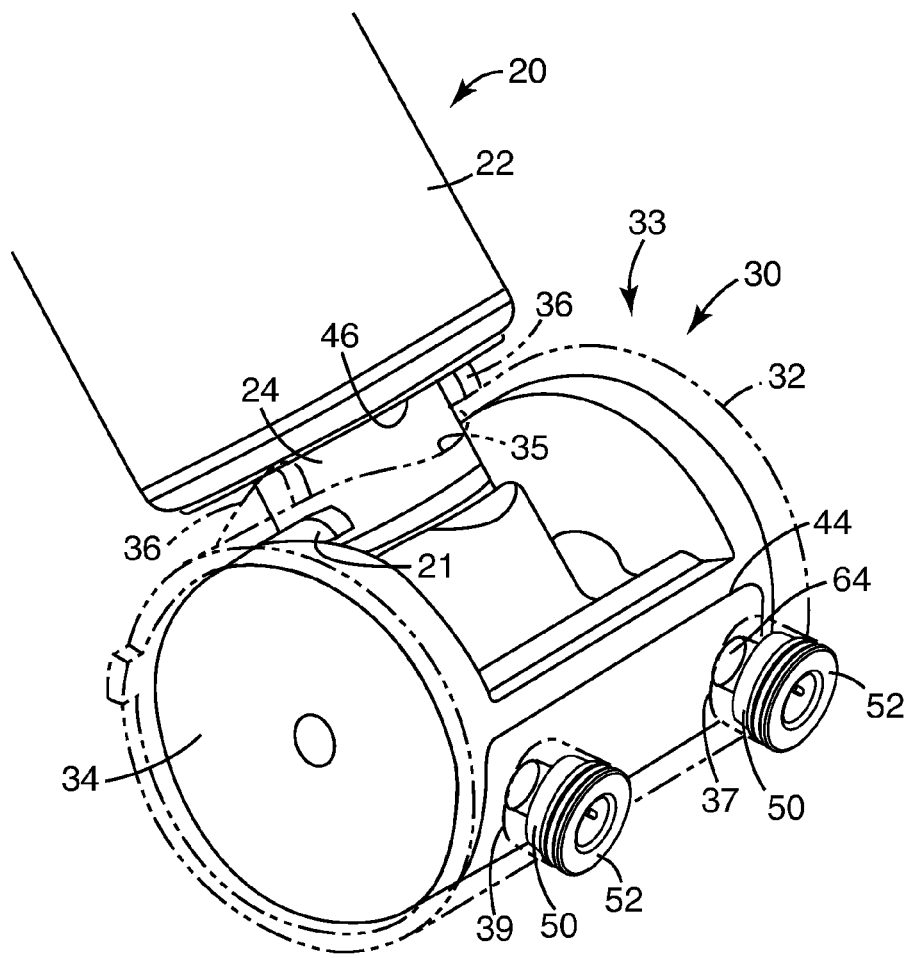
FIG. 13 is a perspective view of a portion of the fluid filter cartridge and spool valve manifold assembly, with the valve housing shown partially transparent, and with the fluid filter cartridge and the valve body in a second rotational position.

As illustrated in FIGS. 4 and 10 and as best illustrated in FIGS. 11 and 13, seal 44 prevents bypass fluid flow path 64 from leaking to the atmosphere. As can be seen in FIG. 11, seals 40 and 42 also prevent fluid from bypass fluid flow path 64 from entering unfiltered fluid flow path 60 and filtered fluid flow path 62. In this particular representative embodiment of the present disclosure, seal 44 also provides a secondary seal for unfiltered fluid flow path 60 and filtered fluid flow path 62 that prevents leakage to the atmosphere should either of seals 40 or 42 fail. Specifically, seal 44 is located between valve housing 32 and valve body 34 and surrounds bypass fluid flow path 64. Seal 44 is also extended around unfiltered fluid flow path 60 and filtered fluid flow path 62. Seal 44 is shown positioned with a groove as is known in the art. As with seals 25 and 26, seals 40, 42 and 44 may be formed from NBR or EPDM elastomers or other suitable materials known to persons of ordinary skill in the art.

Figure 14:
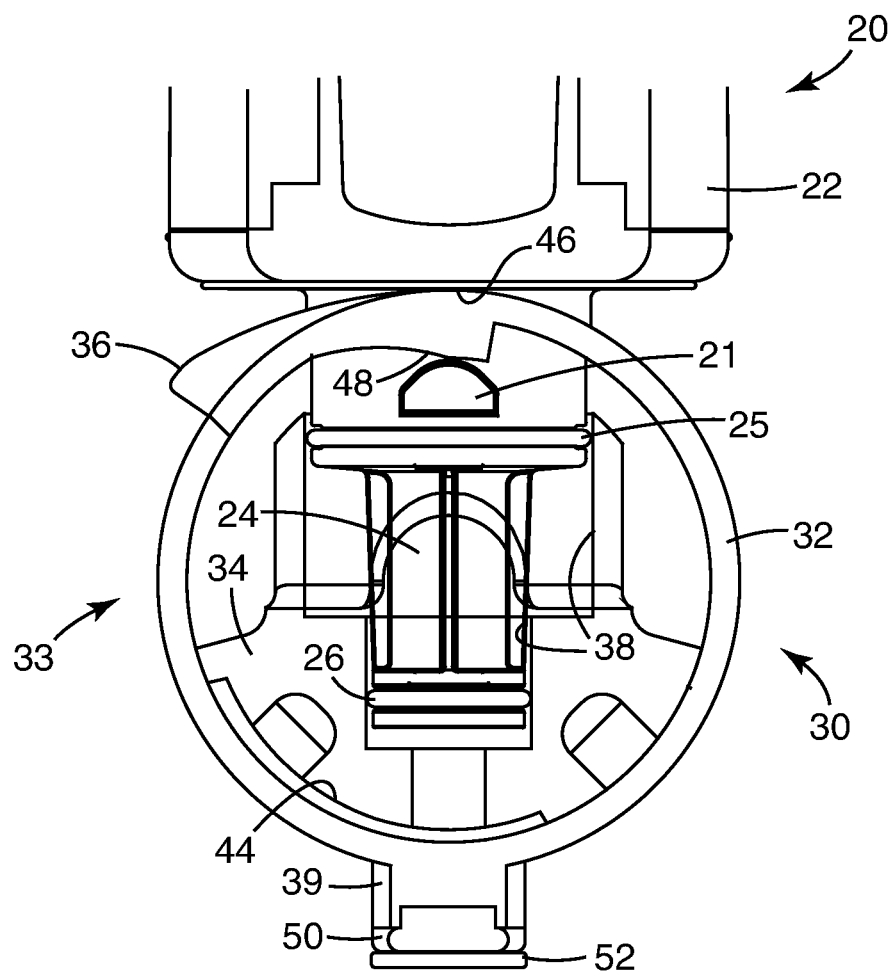
FIG. 14 is a schematic cross-sectional side view of the representative embodiment of FIG. 1, showing one aspect of the insertion and ejection cam components, with the fluid filter cartridge and the valve body in a first rotational position.
Figure 15:
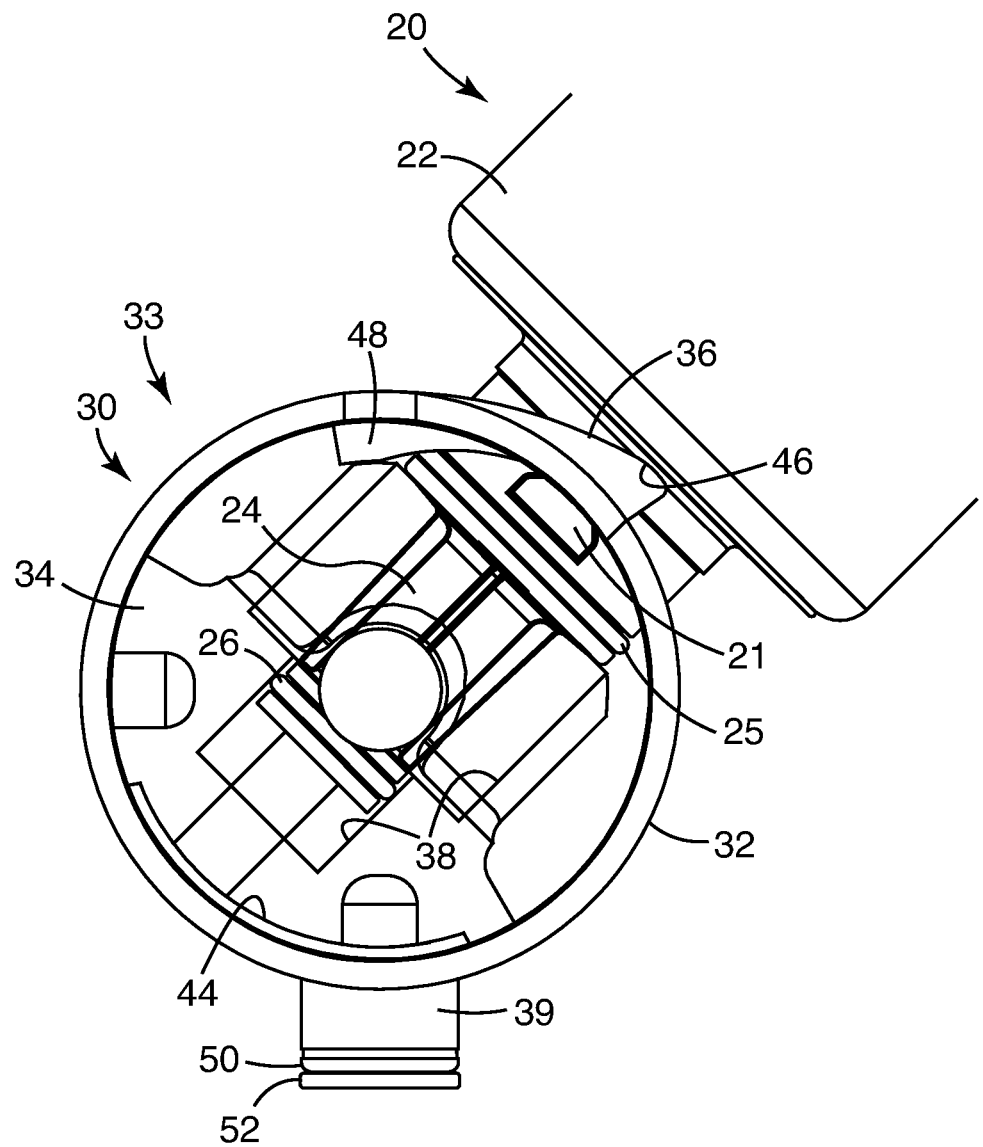
FIG. 15 is a schematic cross-sectional side view of the representative embodiment of FIG. 1, showing one aspect of the insertion and ejection cam components, with the fluid filter cartridge and the valve body in a second rotational position

FIGS. 14 and 15 show a representative filter cartridge 20 inserted into spool valve manifold 30 in the first rotational position and the second rotational position, respectively. Inlet/outlet portion 24 of filter cartridge 20 includes lug 21. Valve housing 32 includes insertion cam 48. Lug 21 and insertion cam 48 may be referred to as insertion cam components. Lug 21 interacts with insertion cam 48 when valve body 34 with filter cartridge inserted is rotated from the second rotational position (as illustrated in FIG. 15) to the first rotational position (as illustrated in FIG. 14). As filter cartridge 20 is rotated from the second rotational position to the first rotational position, lug 21 rides on insertion cam 48 causing cartridge 20 to be advanced into and sealingly mated with valve body 34. The interaction of the insertion cam components causes filter cartridge 20 to be moved opposite to the direction of arrow C (see FIG. 8). Thus, FIG. 14 shows filter cartridge 20 fully seated within valve body 34, while FIG. 15 shows filter cartridge 20 inserted into valve body 34, but not yet sealingly engaged with valve body 34. In the representative embodiment shown, two lugs 21 are provided, one on each side of inlet/outlet portion 24. Correspondingly, two insertion cams 48 are complementarily located on valve housing 32. One of ordinary skill in the art would appreciate that a lug or other surface portion could be provided on valve housing 32 and a corresponding cam portion could be provided on filter cartridge 20.

FIGS. 14 and 15 also show the interaction between ejection cam 36 and a shoulder surface 46 of filter cartridge 20. Ejection cam 36 is provided on valve housing 32. Ejection cam 36 and shoulder surface 46 may be referred to as ejection cam components. When filter cartridge 20 is rotated from the first rotational position (FIG. 14) to the second rotational position (FIG. 15) the interaction between ejection cam 36 and shoulder surface 46 slidably ejects filter cartridge 20 in the direction of arrow C (see FIG. 8) from valve body 34. This interaction breaks the seal between inlet/outlet portion 24 and valve body 34. As with the insertion cam, one of ordinary skill in the art would appreciate that a lug or surface portion could be provided on valve housing 32 and a corresponding cam portion could be provided on filter cartridge 20.

Valve housing 32, valve body 34 and bracket 31 may be formed of any suitable materials known to persons of ordinary skill in the art, including, but not limited to, isoplast or molded polypropylene. Bracket 31 may also be formed from glass-filled prolypropylene or other reinforced plastics for additional strength.

Referring back to FIGS. 1-8, a representative optional handle 28 is shown provided on filter cartridge 20 at an end opposite to the inlet/outlet portion 24 of filter cartridge 20. Handle 28 may be grasped by a user to assist in rotating filter cartridge 20 from the first rotational position to the second rotational position, and vice versa, and also for slidingly removing the disengaged filter cartridge from mounted spool valve manifold assembly 33. Handle 28, because of its position at the far end of filter cartridge 20, reduces the force required to break the sealing engagement between filter cartridge 20 and valve body 34. One of ordinary skill in the art would appreciate that a handle or other means of grasping filter cartridge 20 could be located at other positions along the length of filter cartridge 20 and still provide a mechanical advantage for overcoming any compression set of the seals.

Figure 16:
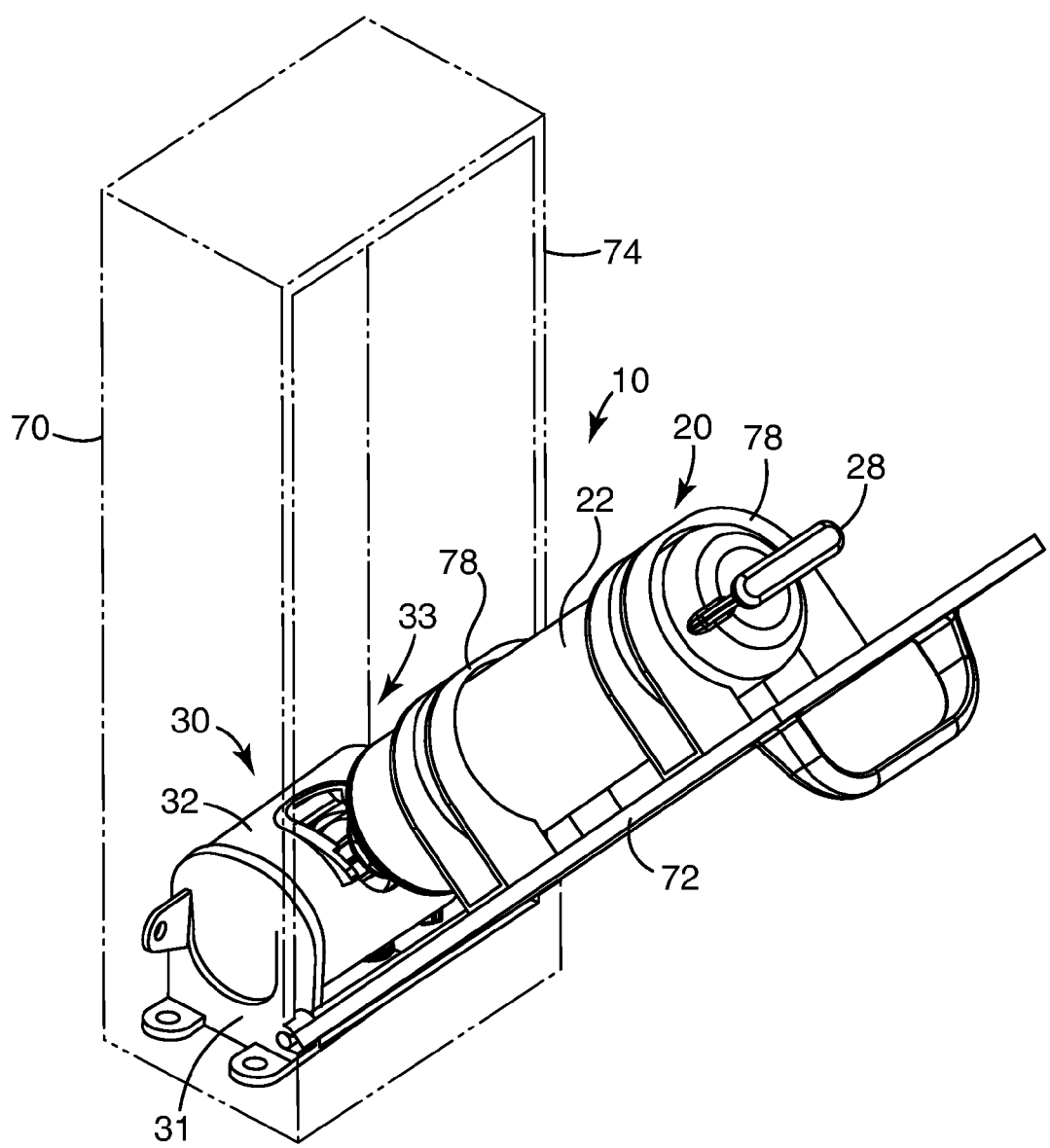
FIG. 16 is a perspective view of the fluid filter cartridge and spool valve manifold assembly shown with an optional mounting enclosure.

For instance, referring to FIG. 16, an enclosure 70 for filter cartridge and spool valve manifold assembly 10 is shown. Enclosure 70 may be mounted to a wall or a door of an appliance or other device. Enclosure 70 includes a door 72 rotationally mounted to box 74 in the vicinity of mounted spool valve manifold assembly 33. A handle 76 is provided on one side of door 72 and one or more brackets 78 are provided on the other side of door 72. Brackets 78 are sized to slidably accommodate filter cartridge 20.

To insert filter cartridge 20 into mounted spool valve manifold assembly 33, a user would open door 72 as illustrated in FIG. 16 and slidably insert filter cartridge 20 into brackets 78 such that lug 21 of filter cartridge 20 is positioned within valve housing 32 and inlet/outlet portion 24 is positioned with valve body. In this rotational position (i.e. the second rotational position), housing inlet port 39 is in fluid communication with housing outlet port 37 via bypass fluid flow path 64. Upon rotating and closing door 72, filter cartridge 20 is slidably driven into sealing engagement with valve body 34 by the interaction of lug 21 with insertion cam 48 as filter cartridge 20 is rotated into the first rotational position. In this first rotational position, as described above, housing inlet port 39 is in fluid communication with cartridge inlet port 29 via fluid flow path 60 and housing outlet port 37 is in fluid communication with cartridge outlet port 27 via fluid flow path 62, thereby allowing fluid from the fluid supply system to be filtered through filter cartridge 20. To remove filter cartridge 20 from mounted spool valve manifold assembly 33, door 72 is rotated open, thereby slidably driving filter cartridge 20 away from valve body 34 and breaking the sealing engagement of filter cartridge 20 with valve body 34 by the interaction of shoulder surface 46 and ejection cam 36.

Due to the simple action of installing the filter cartridge 20 into the mounted spool valve manifold assembly 33, the mounted spool valve manifold assembly 33 can easily be mounted in any orientation and location in or on an appliance or other appropriate device, as would be understood by those skilled in the art. This allows manufactures, such as, for example, appliance manufactures multiple configurations to best suit their application without the need for costly changes to the filter system.

While it may appear that it would be possible to prevent a cartridge from being inserted into the spool valve manifold by having different lug 21 sizes, shapes and locations and combinations thereof along with complimentary insertion cams 48 to effectuate such prevention of an unapproved cartridge from being used in the system, not all such modifications would be optimal and might lead to other issues, as the cartridge lug features are presently believed to be shaped to provide optimum insertion and removal force for the cartridge. By making changes significant enough to prevent an unapproved cartridge from being installed into the manifold, it is presently believed that the cartridge lug shape would have to be changed so that the insertion forces would be significantly increased and the presently believed results would be increased difficulty for operation by the user to activate the valve. It is also presently believed that the forces to un-install the cartridge would also be increased and thus, the system would most likely become more difficult to use by an average user.

Also due to the limited geometry of the cartridge lugs, there would be a very limited number of combinations that would fit thus minimizing the effectiveness of the design for multiple combinations.

The filter cartridge 20 and the spool valve manifold interface each include complimentary key structures. Such complimentary key structures are specifically designed so that only specific type of filter cartridge having the one specific complimentary key structure pattern, out of a plurality of possible key complimentary structure pattern(s) available for such use, can be installed in the spool valve manifold interface(s) having the matching specific complimentary key structure.

One representative system includes a keying system achieved by a mechanical system, as illustrated in FIGS. 17-21, where the various keying features of the filter cartridge have to align and mate correctly with various keying features on the spool valve manifold interface located on the spool valve manifold, the keying features being selected from any operable combination of a plurality of sizes, shapes and locations and combinations thereof with respect to protrusions and depressions formed on the filter cartridge 20 and the spool valve manifold 30, as would be known to those skilled in the art. Mechanical keying systems, such as those disclosed in U.S. Pat. Nos. 6,458,269 and 6,949,189 B2, entitled Keyed Filter Assembly, owned by the assignee of the present application disclose exemplary approaches that are similar to and could be applicable to possible specific embodiments of the present disclosure and are herein incorporated by reference to the extent not inconsistent with the present disclosure.

One representative mechanical keying system 80 is illustrated in FIGS. 17-21. These Figures illustrate the basic principle of the concept and are not intended to disclose all possible combinations of the plurality of various of protrusions and depressions and other operable combinations that can be formed in the interfacing component of the cartridge and in the corresponding receiving component of the spool valve manifold, as would be understood by those skilled in the art.

Figure 17:
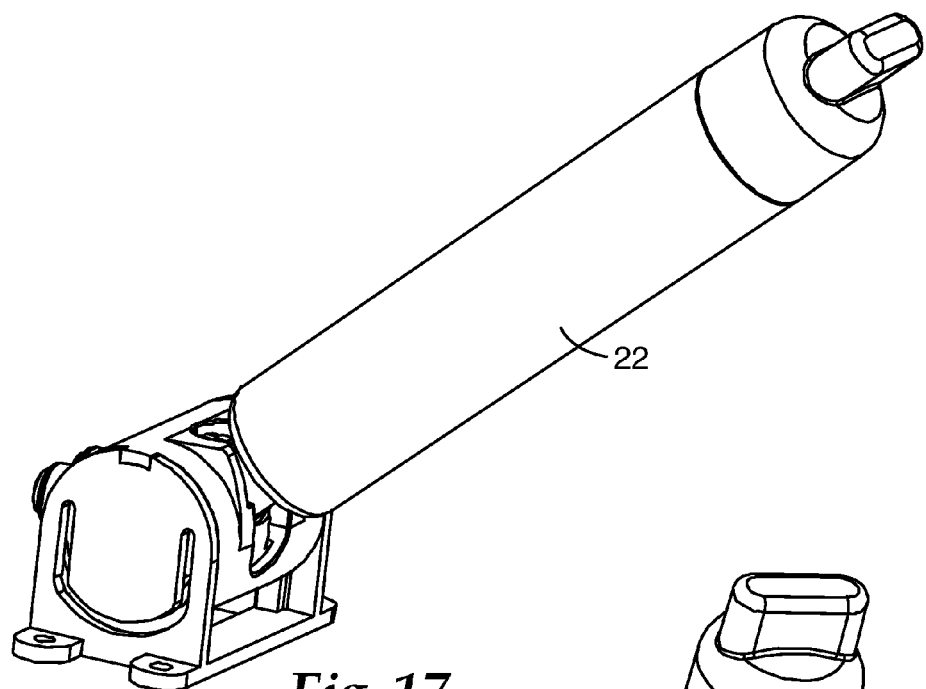
FIG. 17 is a perspective view of the fluid filter cartridge and spool valve manifold assembly shown with a representative keying system.
Figure 18:
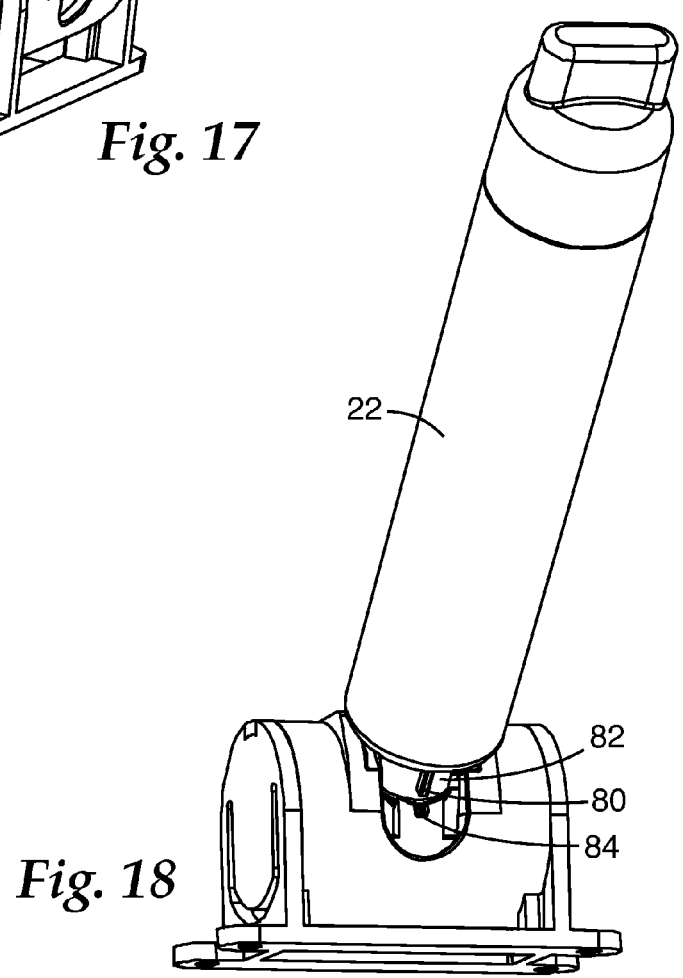
FIG. 18 is a perspective view of the fluid filter cartridge and spool valve manifold assembly shown in FIG. 17 showing the filter cartridge having a representative keying system about to be inserted into the spool valve manifold.
Figure 19:
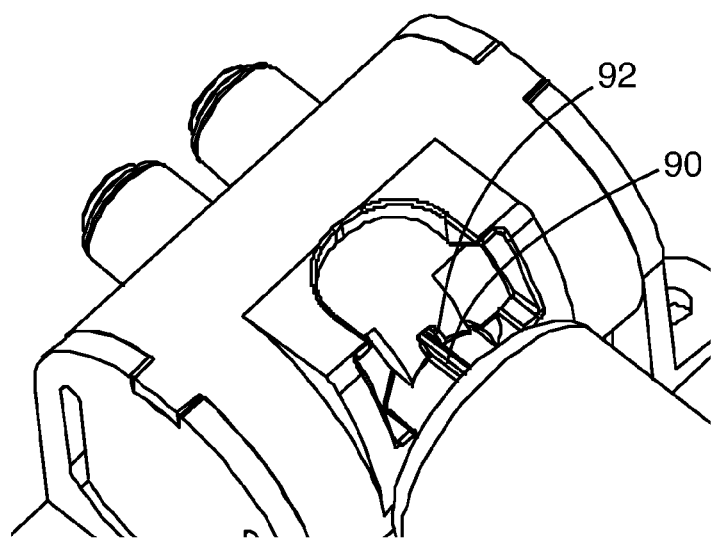
FIG. 19 is a partial perspective view of a representative fluid filter cartridge and spool valve manifold assembly having a representative keying system in the installed/operative position.
Figure 20:
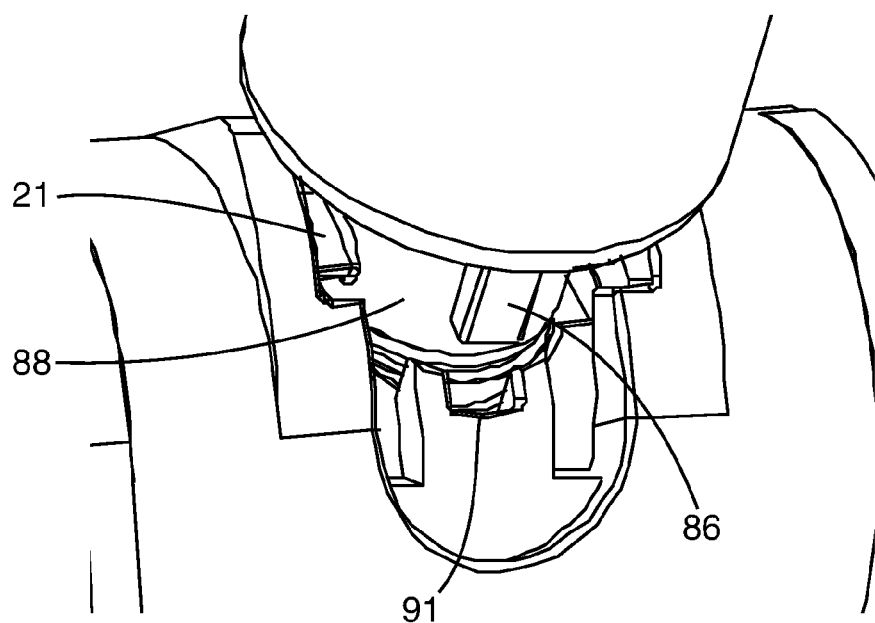
FIG. 20 is a partial perspective view of a representative fluid filter cartridge and spool valve manifold assembly having a representative keying system in the first rotational position prior to being installed in the operative position or being withdrawal from the operative position.
Figure 21:
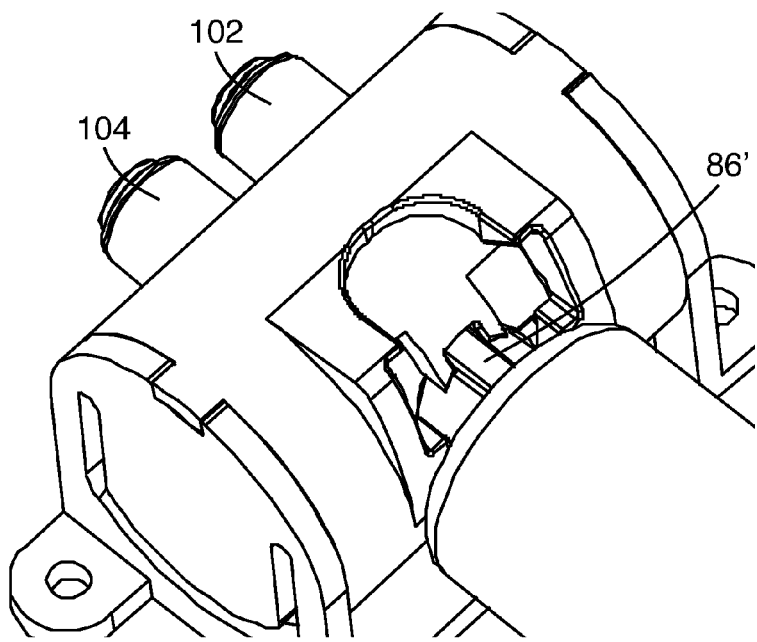
FIG. 21 is a partial perspective view of another representative fluid filter cartridge and spool valve manifold assembly having a representative keying system in the installed/operative position.
Figure 22:
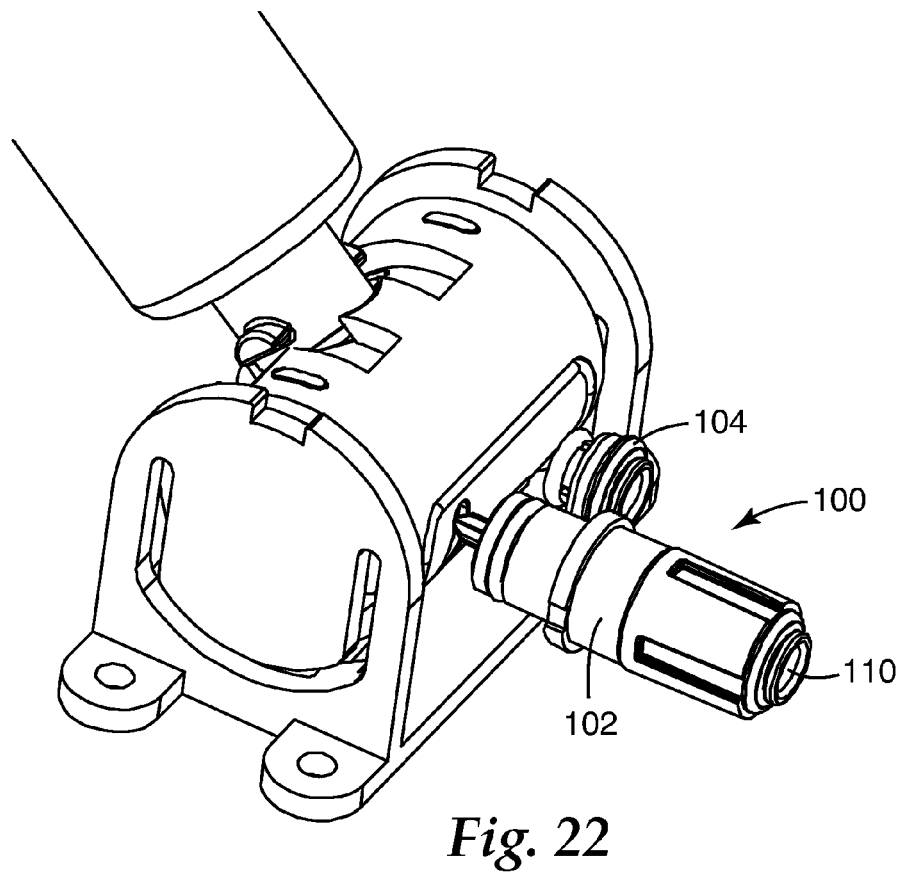
FIG. 22 is a partial perspective view of a representative fluid filter cartridge and spool valve manifold assembly having a representative optional inlet valve in the second rotational position prior to being installed.
Figure 23:
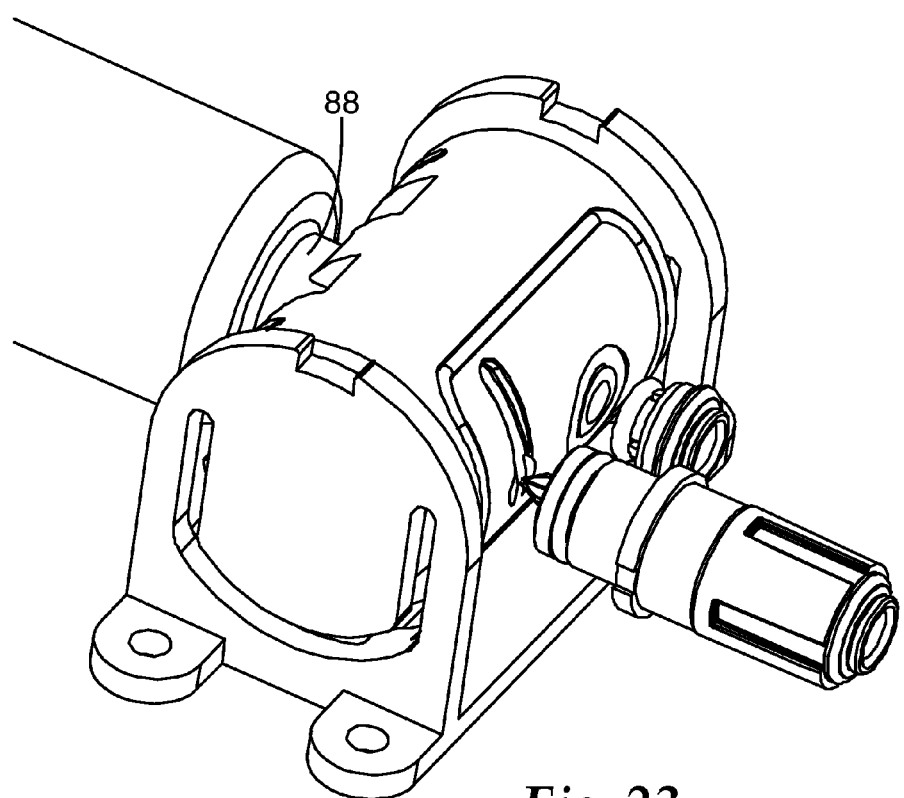
FIG. 23 is a partial perspective view of a representative fluid filter cartridge and spool valve manifold assembly having a representative optional inlet valve in the first rotational position after being installed.

FIGS. 17, 18 and 20 illustrate the concept and in the lining up of the keying structures 82, 84 that have been formed on an appropriate component of the filter cartridge and the spool valve manifold respectively. Specifically, as illustrated, a relatively larger protrusion 86 is formed on one side of the filter cartridge neck 88 and a relatively smaller protrusion 90 is formed on the other side of the filter cartridge neck 88 and complementary sized depressions or cut-outs 91, 92 are formed on the corresponding portion of the spool valve manifold (FIGS. 19 and 20) such that, when the lug 21 is inserted into the insertion cam 48, the filter cartridge is operatively inserted into the spool valve manifold, as best illustrated in FIGS. 19 and 21.

As would be understood by those skilled in the art, the sizes shapes and numbers of complementary protrusions/depressions can be nearly infinitely varied with a limit being the practical consequences of having too many complementary members on any one filter or cartridge/spool valve manifold combination.

Keying systems that perform the selective interfacing function can also be obtained through the use of other non-mechanical technologies such as, but not limited to, RFID tags, magnetic readers and bar code readers and other operative systems known in the art. In these non-mechanical types of keys, electronics would be used to control the activation of the solenoid valves that are used to control the flow of water from the filter cartridge to the end appliance or dispenser, as evidenced by the disclosure contained in US Patent Application Publication No. US 2006/0060512 A1, entitled, System For Monitoring the Performance of Fluid Treatment Cartridges, published Mar. 23, 2006, the disclosure of which is incorporated herein by reference to the extent not inconsistent with the present disclosure, as would be understood by those skilled in the art.

One possible optional inlet component that can be incorporated into the manifold assembly of the present disclosure provides a mechanism for converting the system to a "shut-off" style system when a filter cartridge is not installed in the spool valve manifold. This optional component (a modified inlet) utilizes a poppet valve that is controlled by a cam surface on the valve spool valve manifold. When the spool valve manifold is turned to the filter cartridge un-install position, the poppet valve will close thus arresting the flow of fluid though the spool valve manifold. When the spool valve manifold is turned to the filter mode position (filter installed position), the poppet valve will be forced open to allow fluid to flow through the spool valve manifold and into the filter cartridge.

As illustrated in FIGS. 22-26, the modified inlet assembly 100 is configured as a "floating" assembly. The floating assembly is spring loaded such that, as internal pressure in the filter cartridge and the spool valve manifold increase, the inlet subassembly will start to push away from the spool valve manifold and the poppet valve will start to close. Once a predetermined pressure is reached at the inlet, the inlet subassembly will be pushed away from the spool valve manifold a distance sufficient for the poppet valve to seat (close) and thus shutoff the fluid flow into the spool valve manifold and subsequently into the filter cartridge.

The spool valve manifold 30 component of the liquid filter cartridge and spool valve manifold assembly 10, according to the present disclosure, presently preferably, comprises three sections; those being the inlet assembly 100, the filter interconnect structure 102 and the outlet assembly 104. The inter-relationship of these three sub-components controls the flow of fluid, presently preferably, water into and out of the filter cartridge 20. In the illustrated representative embodiment, the inlet assembly 100 is a sprung element. By the term, "sprung element," we mean that, as the filter cartridge 20 is installed into and removed from the manifold assembly 30, the inlet assembly 100 will traverse up and down with the movement of the filter cartridge neck or stem 88.

As illustrated, the spool valve manifold inlet assembly 30 comprises a representative outlet assembly 102; a representative inlet assembly 100, a representative inlet return spring 106 and a representative inlet return stop 108.

As illustrated in FIGS. 22-26, one presently preferred embodiment of the inlet assembly 100, according to the present disclosure, comprises a representative inlet 110, a representative inlet connector 112, a representative poppet valve 114, a representative poppet valve spring 116, a representative collet 118 a representative collet retainer 120, and representative sealing structure or o-rings 122.

Inlet assembly 100 comprises a head interface section 123, for interfacing with the filter interconnect structure (Head) 124, and comprises inlet connector 112 for receiving sealing structure, such as, for example, an o-ring 125, operatively positioned therein, an inlet poppet valve 114 having a spring operatively positioned thereon for biasing the poppet valve 114 toward the filter cartridge 20, when a filter cartridge is positioned in the liquid filtration system is operatively positioned in the spool valve manifold assembly 10.

Figure 25:
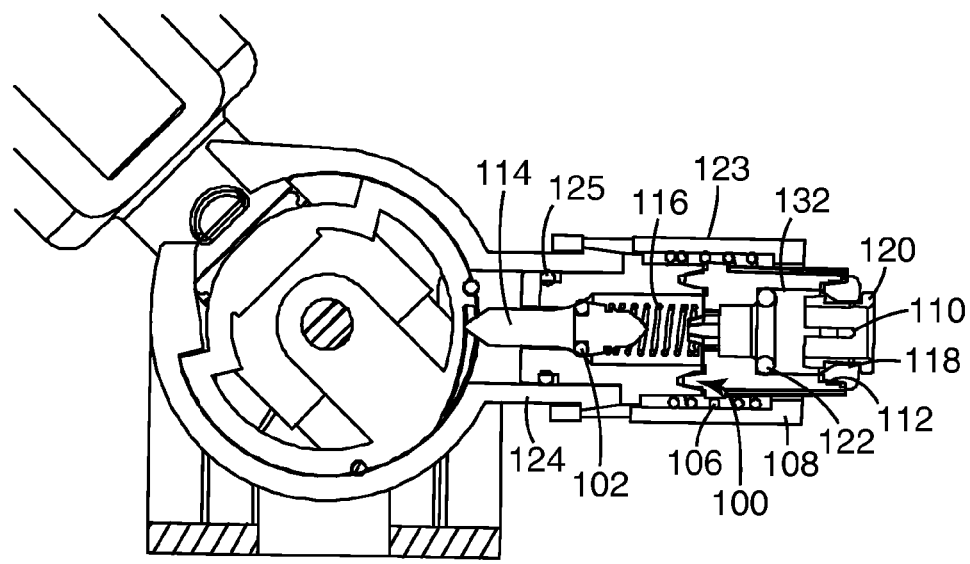
FIG. 25 is a schematic cross-sectional side view of the representative embodiment of FIG. 23, showing one aspect of the optional inlet valve, with the fluid filter cartridge and the valve body in a second rotational position or the uninstalled position.
Figure 26:
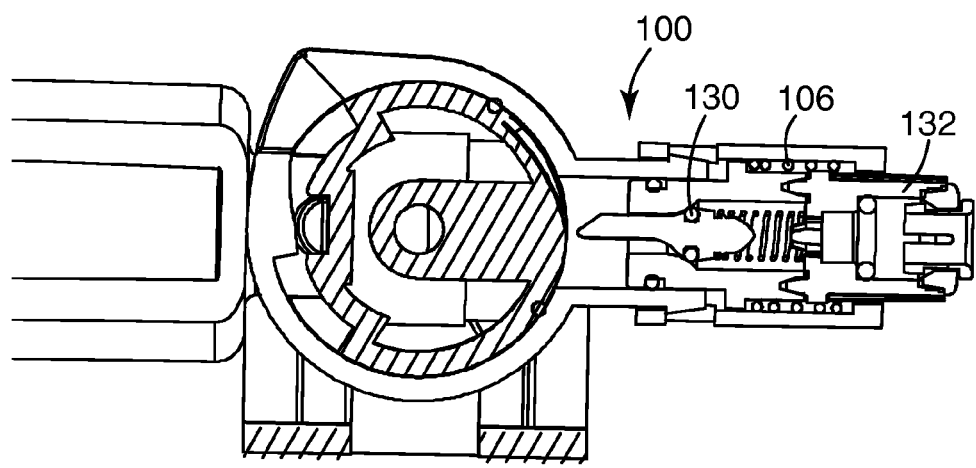
FIG. 26 is a schematic cross-sectional side view of the representative embodiment of FIG. 23, showing a high pressure condition, with the fluid filter cartridge and the valve body in a first rotational position and the a poppet valve in the closed condition.

As best illustrated in FIGS. 25-26, an inlet return spring 106 is provided and operatively interfaces with the inlet assembly 100, as will be described in more detail below.

Since the inlet assembly 100 is a sprung element, the inlet assembly 100 will also traverse up and down due to fluid pressure when the cartridge is installed in the manifold assembly 30. Specifically, the poppet value 114 is always engaged with the filter cartridge poppet interface 126 when the filter cartridge is installed and the poppet valve 114 is biased in the open position. However, as the fluid pressure of the liquid filtration system (not shown) is increased, the inlet assembly 100 will start to move up and away from the filter cartridge 20. As the liquid pressure increase is continued, the inlet assembly 100 will move far enough away from the filter cartridge 20 that the poppet valve 114 will close, thus shutting off the inlet liquid pressure, as illustrated in FIG. 26.

To have a fluid filtration system with a mechanism that allows the filter to translate in and out (click-in/click-out), it has been found that at least one of the ports that control water flow (inlet or outlet port) into or out of the system must be allowed to "float."

In a static condition (i.e. the fluid filtration system is full of fluid or water, but the outlet port is closed, so that no water can move through the fluid filtration system), water is trapped in every volumetric cavity that can contain water (this is basically between every pressurized O-ring).

Therefore, in order to translate the filter cartridge forward, these volumetric cavities need to be able to translate with the filter (this basically requires that a column of water be moved without changing its volume).

If the inlet 110 of the present disclosure were not allowed to move/translate/float, the column of water that is trapped between the filter O-rings would not be able to translate and would have to be compressed. If these columns of water were required to compress in order to effectuate filter translation, as the filter cartridge is pushed forward during un-install, the force to compress the water that is trapped between the filter O-rings would be extremely high due to hydraulic pressure required to compress water.

Therefore, the benefits derived from the optional "floating" inlet have been found to be quite desirable to the successful operation of this particular representative embodiment of the present disclosure. While we have illustrated the inlet as the "floating" component, it should be understood that the outlet or other valve sub assembly that enables water to be displaced without compressing the water could also be utilized as the "floating" component.

Figure 24:
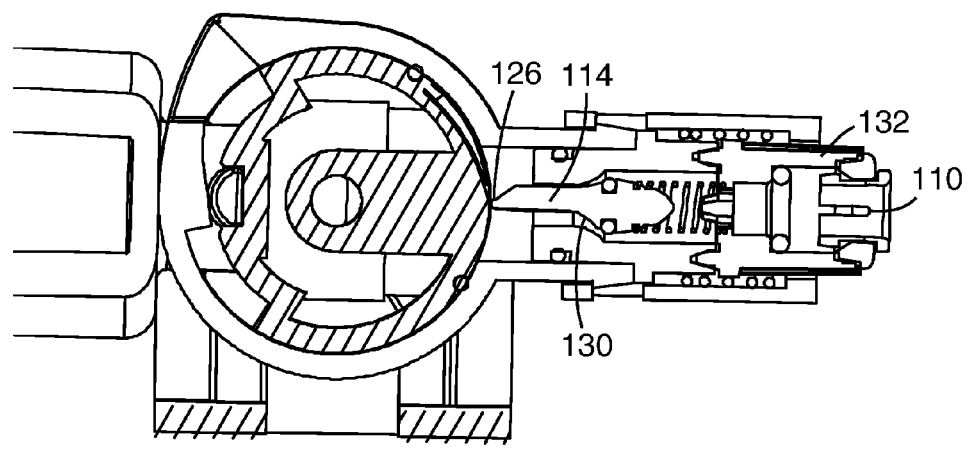
FIG. 24 is a schematic cross-sectional side view of the representative embodiment of FIG. 23, showing one aspect of the optional inlet valve, with the fluid filter cartridge and the valve body in a first rotational position or the installed position.

This phenomenon of the inlet assembly 100 floating according to the amount of fluid pressure in the system transforms the system of the present disclosure into an automatic liquid shut-off system. As illustrated in FIG. 26, the liquid pressure increases past a selected, predetermined desired maximum operating system pressure, the poppet valve 114 will be closed thereby closing the poppet valve inlet 130 and automatically shutting-off liquid flow to the filter cartridge 20 by the movement of the inlet assembly 100 away from the filter cartridge 20. Once the liquid pressure decreases to a level that is within the selected, operating pressure of the system, the poppet valve inlet 130 will open, see FIG. 24, thereby allowing the fluid to flow into and through the filter cartridge 20 exiting the liquid filtration system via the outlet 110, as illustrated in FIG. 24.

Because the liquid filtration system (not shown) and utilized with the present disclosure is capable of automatically controlling the operating pressure limits, some unique system safety features directly result therefrom. For example, if the liquid filtration system were to experience a water spike (i.e. water hammer) or high pressure, the downstream components of the inlet assembly (i.e. head, bracket, filter cartridge, outlet assembly, etc) would not be subjected to this water spike or high pressure, greater than about 100 psi. Specifically, as the illustrated in FIG. 26, the inlet assembly 132 has moved more distant from the poppet valve 114, as compared to FIG. 25, thereby moving the poppet valve seat out of contact with the spool valve manifold 10 and thus preventing the flow of liquid into or out of filter cartridge.

Due to this unique and innovative safety feature, the downstream components of the manifold assembly 30 and filter cartridge 20 do not need to be constructed to withstand such high pressure events. Not being required to construct the down stream components to withstand such a high pressure would enable the liquid filtration system manufacturer to realize a significant cost savings in the types of material that need to be used and the strength of those materials used. Fluid filter systems, manufactured in accordance with the present disclosure, could now be built with lower price commodity materials and relatively thin wall sections, as compared to the materials and wall thickness now common in such systems. Utilization of lower price commodity materials and relatively thin wall sections would dramatically reduce the cost of each component from a material cost and a manufacturing cost perspective.

Thus, it is possible to produce a plurality of representative fluid filter systems in accordance with the present disclosure, as described above, which can be customized to whatever pressures limits to which the manufacture desires that the overall fluid filter system should be controlled. As should be understood, shut-off pressures are controlled by the inlet return/compression spring 106 and by changing the characteristics of this inlet return/compression spring 106 the opening pressure and the shutoff pressure can be varied, in accordance with known principles.

The poppet valve 114 of the inlet assembly 100 has the ability to shutoff flow at high pressures and reset itself or return to normal flow operation once the pressure level falls back below a predetermined maximum limit. This predetermined maximum limit can be simply modified by adjusting the strength of the inlet return spring, as would be known to those skilled in the art.

Although the present disclosure has been described and illustrated with respect to example embodiments, it is apparent that modifications and changes can be made thereto without departing from the spirit and scope of the presently disclosed fluid filtration system comprising a fluid filtration assembly and a replaceable fluid filter cartridge containing filter media, the fluid filtration assembly having the capability for facilitating the removal of a first replaceable fluid filter cartridge and then having the capability for facilitating the installation of another replaceable fluid filter cartridge therein in a fluid supply system and, in particular, to the spool valve manifold assembly that facilitates the quick and easy removal and installation of the replaceable fluid filter cartridges from and into the fluid filtration assembly as defined in the following claims.

What is claimed is:

1. A filter cartridge comprising:
   a sump;
   an inlet/outlet portion extending from one end of the sump having an outside diameter that is smaller than an outside diameter of the sump, the inlet/outlet portion having a cartridge inlet port and a cartridge outlet port;
   a first lug on the inlet/outlet portion protruding outwardly from a surface of the inlet/outlet portion in a radial direction perpendicular to a central axis of the filter cartridge;
   a shoulder surface that is formed by the intersection of the sump and the inlet/outlet portion;
   a filter disposed within the sump; and
   the first lug comprising a curved surface facing the shoulder surface and curving away from the shoulder surface such that a distance between the curved surface and the shoulder surface varies and wherein a minimum distance between the curved surface and the shoulder surface is located in a plane intersecting with the central axis and bisecting the first lug into two halves.

2. The filter cartridge of claim 1 wherein the curved surface comprises a half-moon shape.

3. The filter cartridge of claim 1 further comprising a mechanical keying system on the inlet/outlet portion.

4. The filter cartridge of claim 3 wherein the mechanical keying system comprises protrusions and depressions on the inlet/outlet portion.

5. The filter cartridge of claim 1 wherein the inlet/outlet portion further comprises one or more protrusions that protrude outwardly in a radial direction perpendicular to the central axis.

6. The filter cartridge of claim 5 wherein the one or more protrusions are complementary to one or more depressions on a manifold.

7. The filter cartridge of claim 1 wherein a slope of the curved surface transitions from a positive slope to a negative slope at the minimum distance.

8. The filter cartridge of claim 7 wherein the curved surface is symmetrical about the minimum distance.

9. A filter cartridge comprising:
   a sump;
   a stepped inlet/outlet having a first portion extending from one end of the sump having an outside diameter that is smaller than an outside diameter of the sump, and having a second portion extending from the first portion having an outside diameter that is smaller than the outside diameter of the first portion, the stepped inlet/outlet comprising a cartridge inlet port in the first portion, and a cartridge outlet port in the second portion aligned with a central axis of the filter cartridge;
   a first lug on the first portion protruding outwardly from a surface of the first portion in a radial direction perpendicular to the central axis;
   a shoulder surface that is formed by the intersection of the sump and the stepped inlet/outlet;
   a filter disposed within the sump; and
   the first lug comprising a curved surface facing the shoulder surface and curving away from the shoulder surface such that a distance between the curved surface and the shoulder surface varies and wherein a minimum distance between the curved surface and the shoulder surface is located in a plane intersecting with the central axis and bisecting the first lug into two halves.

10. The filter cartridge of claim 9 further comprising a mechanical keying system on the stepped inlet/outlet.

11. The filter cartridge of claim 10 wherein the mechanical keying system comprises protrusions and depressions on the stepped inlet/outlet.

12. The filter cartridge of claim 9 wherein the stepped inlet/outlet further comprises one or more protrusions that protrude outwardly in a radial direction perpendicular to the central axis.

13. The filter cartridge of claim 12 wherein the one or more protrusions are complementary to one or more depressions on a manifold.

14. The filter cartridge of claim 9 wherein a slope of the curved surface transitions from a positive slope to a negative slope at the minimum distance.

15. The filter cartridge of claim 14 wherein the curved surface is symmetrical about the minimum distance.

16. A filter cartridge comprising:
a sump;
a stepped inlet/outlet having a first portion extending from one end of the sump having an outside diameter that is smaller than an outside diameter of the sump, and having a second portion extending from the first portion having an outside diameter that is smaller than the outside diameter of the first portion, the stepped inlet/outlet comprising a cartridge inlet port and a cartridge outlet port aligned with a central axis of the filter cartridge;
a first lug on the first portion protruding outwardly from a surface of the first portion in a radial direction from the central axis of the filter cartridge;
a second lug on the first portion protruding outwardly from the surface of the first portion in a radial direction from the central axis of the filter cartridge;
a shoulder surface that is formed by the intersection of the sump and the stepped inlet/outlet;
a filter disposed within the sump; and
a first curved surface on the first lug facing the shoulder surface and curving away from the shoulder surface such that a distance between the first curved surface and the shoulder surface varies and wherein a minimum distance between the first curved surface and the shoulder surface is located in a plane intersecting with the central axis and bisecting the first lug into two halves; and
a second curved surface on the second lug facing the shoulder surface and curving away from the shoulder surface such that a distance between the second curved surface and the shoulder surface varies and wherein a minimum distance between the second curved surface and the shoulder surface is located in the plane intersecting with the central axis and bisecting the first lug into two halves.

17. The filter cartridge of claim 16 further comprising a mechanical keying system on the stepped inlet/outlet.

18. The filter cartridge of claim 17 wherein the mechanical keying system comprises protrusions and depressions on the stepped inlet/outlet.

19. The filter cartridge of claim 16 wherein the stepped inlet/outlet further comprises one or more protrusions that protrude outwardly in a radial direction perpendicular to the central axis.

20. The filter cartridge of claim 19 wherein the one or more protrusions are complementary to one or more depressions on a spool valve manifold.

21. The filter cartridge of claim 16 wherein a slope of the first curved surface transitions from a positive slope to a negative slope at the minimum distance and wherein a slope of the second curved surface transitions from a positive slope to a negative slope at the minimum distance.

* * * * *

UNITED STATES PATENT AND TRADEMARK OFFICE
CERTIFICATE OF CORRECTION

PATENT NO. : 9,687,762 B2  
APPLICATION NO. : 15/137162  
DATED : June 27, 2017  
INVENTOR(S) : Brian Tubby Page 1 of 1

It is certified that error appears in the above-identified patent and that said Letters Patent is hereby corrected as shown below:

In the Specification

Column 1
Line 8, delete "13/459441," and insert -- 13/459,441, --, therefor.

Column 4
Line 29, delete "position" and insert -- position; --, therefor.

Column 5
Line 7, after "the" delete "a".

Column 6
Lines 64-65, delete "prolypropylene" and insert -- polypropylene --, therefor.

Column 8
Line 60, delete "prolypropylene" and insert -- polypropylene --, therefor.

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*